United States Patent
Chang

(10) Patent No.: US 6,526,525 B1
(45) Date of Patent: Feb. 25, 2003

(54) PCI DEBUGGING DEVICE, METHOD AND SYSTEM

(75) Inventor: Wen-Ching Chang, Yong-Ho (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/460,666

(22) Filed: Dec. 13, 1999

(30) Foreign Application Priority Data

Aug. 27, 1999 (TW) .................................. 88114691 A

(51) Int. Cl.[7] .................................................. G06F 11/00
(52) U.S. Cl. ................................................ 714/40; 714/44
(58) Field of Search ............................... 714/40, 43, 44, 714/47; 710/107, 113, 119

(56) References Cited

U.S. PATENT DOCUMENTS 5,608,867 A * 3/1997 Ishihara ........................ 714/25
6,324,663 B1 * 11/2001 Chambers ..................... 714/43

OTHER PUBLICATIONS

PCI Local Bus Specification Rev. 2.1 p. 73–80.*

* cited by examiner

*Primary Examiner*—Robert Beausoliel
*Assistant Examiner*—Marc Duncan
(74) *Attorney, Agent, or Firm*—J.C. Patents

(57) ABSTRACT

A PCI debugging device, method and system. The PCI interface includes a request signal, a grant signal and a target ready signal. The system has a debugging mode such that current grant signal will be retained as long as the request signal remains activated. Using a decoding comparator circuit, the debugging device decodes an instantaneous command signal from the PCI interface and compares with a user-defined wait-to-debug command signal so that an identical command signal for activating the request signal can be generated. Due to the continuous activation by the request signal on the PCI interface, the system halts to display system data via a display circuit so that debugging is facilitated.

20 Claims, 6 Drawing Sheets

PCI DEBUGGING DEVICE, METHOD AND SYSTEM

CROSS-REFERENCE TO RELATED APPLICATION

This application claims the priority benefit of Taiwan application serial no. 88114691, filed Aug. 27, 1999.

BACKGROUND OF THE INVENTION

1. Field of Invention

The present invention relates to a computer system debugging device and method. More particularly, the present invention relates to a debugging device, method and system for a computer system having a peripheral component interconnection (PCI) bus.

2. Description of Related Art

FIG. 1 is a block diagram showing a PCI bus system connecting various components of a conventional computer system. As shown in FIG. 1, a central processing unit 10 is coupled to the PCI bus 14 via a host bridge 12. The host bridge 12 is further coupled to a system memory 11. The master controller of several PCI compatible peripheral devices such as a graphic adapter 16a, an expansion bus bridge 16b, a LAN adapter 16c and a SCSI host bus adapter 16d can also be coupled to the PCI bus 14. Each of these master controllers is able to send out a request (RST) signal demanding the use of the PCI bus 14. The host bridge 12 serves as an arbitrator that sends out grant (GNT) signals to the controller when the PCI bus 14 is available.

Data transmission between PCI compatible devices (such as the master controllers or the north bridge of a computer chipset) are controlled by a few interface control signals. A cycle frame (FRAME) is issued from an initiator (can be the master controller or the north bridge) indicating the initialization of a data access operation and the duration therein. As soon as the FRAME signal is out, data transaction via the PCI bus begins. A low potential for the FRAME signal indicates data transmission is in progress. After the initiation of data transaction, the address bus AD will send out a valid address during the address cycle. In the meantime, the command/byte enable (CBE[3:0]) signal lines will send out a valid bus command (according to PCI specification) so that the target device knows the data transaction mode demanded by the initiator. In general, the four bits of the command/byte enable signal lines are capable of coding up to a maximum of 16 different commands, and each command is defined in detail in the PCI specification. After the effective address is out, a data cycle begins in which data is transmitted through the address bus AD. In the meantime, byte enable signals are sent so that data can be transmitted. When the transmission of FRAME signal stops, the last set of data is transmitted and no more in the current transaction. An initiator ready (IRDY) signal and a target ready (TRDY) signal are also used by the system for displaying the readiness of the initiating device and the target device in data transaction. In a data read operation, the IRDY signal indicates that the initiator is ready to receive the demanded data. In a data write operation, the TRDY signal indicates that the target device is ready to receive the demanded data. A stop (STOP) signal is used by the target device to request a termination of data transaction from the initiator.

FIG. 2 is a timing diagram showing the various signals in the PCI bus interface during a read operation. The period within which data are transmitted via the PCI bus is known as a bus transaction cycle 20. The bus transaction cycle 20 includes an address cycle 22 and several data cycles, for example, 24a, 24b and 24c. Each data cycle 24a/b/c can be further divided into a wait cycle 26a/b/c and a data transfer cycle 28a/b/c. The following is a brief description of the PCI bus interface during a read operation for illustrating the control signals according to PCI specification.

During cycle T1, a FRAME signal is sent by the initiator indicating the start of a data transaction while a start address is put on the address bus AD lines to locate the target device of the transaction. In the meantime, a read command is transmitted through the CBE lines. After the delivery of the read command, a byte enable signal is put on the CBE lines. The byte enable signals are sent throughout the data cycles (including 24a, 24b and 24c). During cycle T2, the initiator submits an initiator ready signal IRDY indicating its readiness for data transmission. However, the target device is still not ready yet. Hence, the target device keeps preparing the data while the initiator idles in the wait cycle 26a of the data cycle 24a. During cycle T3, the target device has prepared all the necessary data for transmission, thereby sending out a target ready TRDY signal. Therefore, in data cycle 28a, both IRDY and TRDY are out and so the initiator can begin to read data from the target device. During cycle T4, the target device no longer issues the target ready TRDY signal, which signals the end of the first set of transmission data. Meanwhile, a set of data is prepared inside the target device. Again, the initiator enters a wait cycle 26b within the data cycle 24b. During cycle T5, the target ready TRDY signal is issued indicating the second set of data is ready. The second set of data is ready by the initiator in cycle 28b when both the IRDY and the TRDY signals are issued. When the initiator has insufficient time to read all the data from the target device as in cycle T6, the IRDY signal terminates. Since the TRDY signal is still out, the wait cycle 26c is activated by the initiator. As soon as the initiator is ready again as in cycle T7, the IRDY signal is re-issued. The initiator reads the data from the target device during data transfer cycle 28c when both IRDY and TRDY signals are issued, thereby completing a single read operation.

For the engineers engaged in PC hardware maintenance and development as well as researchers and students experimenting with PCs, the ISA bus card should be quite familiar. The ISA bus card is an indispensable tool for system debugging, repair and signal display. Compared with a logic analyzer, the ISA bus is a rather inexpensive and useful analytical tool. However, due to the continual increase in operating frequency in most PC system (for example, over 133 MHz for CPU, over 66 MHz for AGP and over 33 MHz for PCI bus), the ISA bus operating at mere 8 to 10 MHz has fallen too much behind other devices in speed. Consequently, the ISA bus is likely to be completely replaced by PCI bus in the near future. In fact, most manufacturers of main computer board have stopped adding an ISA bus slot on the main board.

However, only very simple PCI display cards having no termination capability are available in the PC market. These display cards is only capable of displaying address, data and command signals. In addition, each display card must rely on the I/O CHANNEL READY signal of an ISA bus debug card for halting the system temporarily. Therefore, given that a main computer board no longer has an ISA bus slot, debugging and repair can hardly proceed. Hence, there is an urgent demand for a PCI debugging device having some halting capability.

SUMMARY OF THE INVENTION

Accordingly, one object of the present invention is to provide a PCI debugging device with a PCI interface. The user of the PCI debugging device is capable of halting the system and retrieving system information such as the address, data and command signals once the device is plugged into the PCI interface slot of the system. In addition, an ISA bus debug card is unnecessary.

A second object of the invention is to provide a method for debugging a system with a PCI interface such that system operation can be halted and address, data and command signals of the system can be displayed.

To achieve these and other advantages and in accordance with the purpose of the invention, as embodied and broadly described herein, the invention provides a PCI debugging device with a PCI interface. The PCI interface includes a request signal, a grant signal and a target ready signal. The system includes a debugging mode. If the request signal is enable while the system is in the debugging mode, the system will keep the grant signal. The PCI debugging device includes: a switching circuit for setting a wait-to-debug command signal; a system data display circuit for displaying data on the PCI interface and sending out an instantaneous command signal; a decoding comparator circuit for decoding the instantaneous command signal and comparing with the wait-to-debug command signal so that an identical command signal can be produced; and a latch circuit having reset capability for latching the identical command signal and activating the request signal. Since the system halt will not throw away the grant signal as long as the request signal is activated, debugging operation is facilitated.

This invention also provides a method for debugging a system having a PCI interface. The system has a debugging mode while the PCI interface includes a request signal, a grant signal and a target ready signal. In the debugging mode, as long as the request signal is activated, the grant signal is retained by the system. The method includes the steps of: providing a wait-to-debug command signal; detecting an instantaneous command signal from the PCI interface; decoding the instantaneous command signal; comparing the instantaneous command signal and the wait-to-debug command signal and generating an identical command signal; and providing a reset input to clear the request signal. Since the system halt will not throw away the grant signal as long as the request signal is activated, debugging operation is facilitated.

This invention also provides a debugging system with a PCI interface. The PCI interface includes a request signal, a grant signal and a target ready signal. The debugging system includes a computer system with a PCI interface slot. The computer system has a debugging mode. In the debugging mode, as long as the request signal remains activated, the computer system will retain any grant signal. The debugging system also includes a PCI debugging card inserted into the PCI interface slot. The PCI debugging card has a switching circuit for setting a wait-to-debug command signal; a system data display circuit for displaying data on the PCI interface and sending out an instantaneous command signal; a decoding comparator circuit for decoding the instantaneous command signal and comparing with the wait-to-debug command signal so that an identical command signal is produced under the right condition; and a latch circuit having reset capability for latching the identical command signal and activating the request signal.

According to the embodiment of this invention, when the PCI interface detects a PCI debugging card on system startup, the system will proceed to a debugging mode immediately. On the other hand, if no PCI debugging card is detected, the system will proceed to a normal running mode after a preset period. Alternatively, the PCI interface of the system can be set in such a way that the system will automatically proceed to the debugging mode on system startup. After the execution of the BIOS program, the system immediately returns to a normal mode of operation.

In the embodiment of this invention, the computer system can further include a resistor for setting the computer system into the debugging mode. Alternatively, a resistor can be inserted into the PCI debugging card. In that case, the computer system has to detect the presence of this resistor through the PCI interface. The resistor can be coupled to a high potential (pull up) or a low potential (pull down). As long as the voltage level of the resistor can be detected by the computer system, whether the system should get into a debugging mode or a normal can be easily determined.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
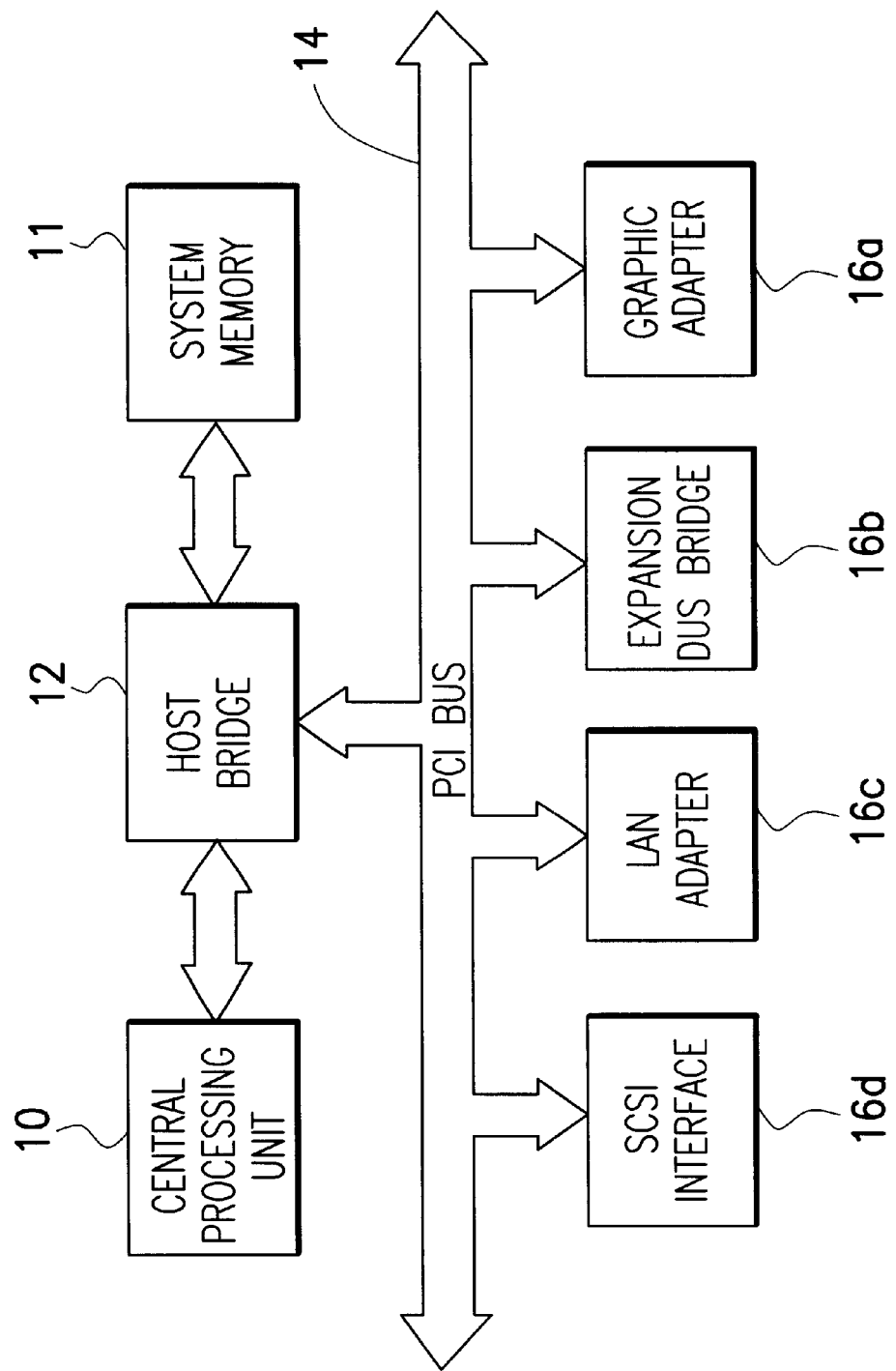
FIG. 1 is a block diagram showing a PCI bus system connecting various components of a conventional computer system.
Figure 2:
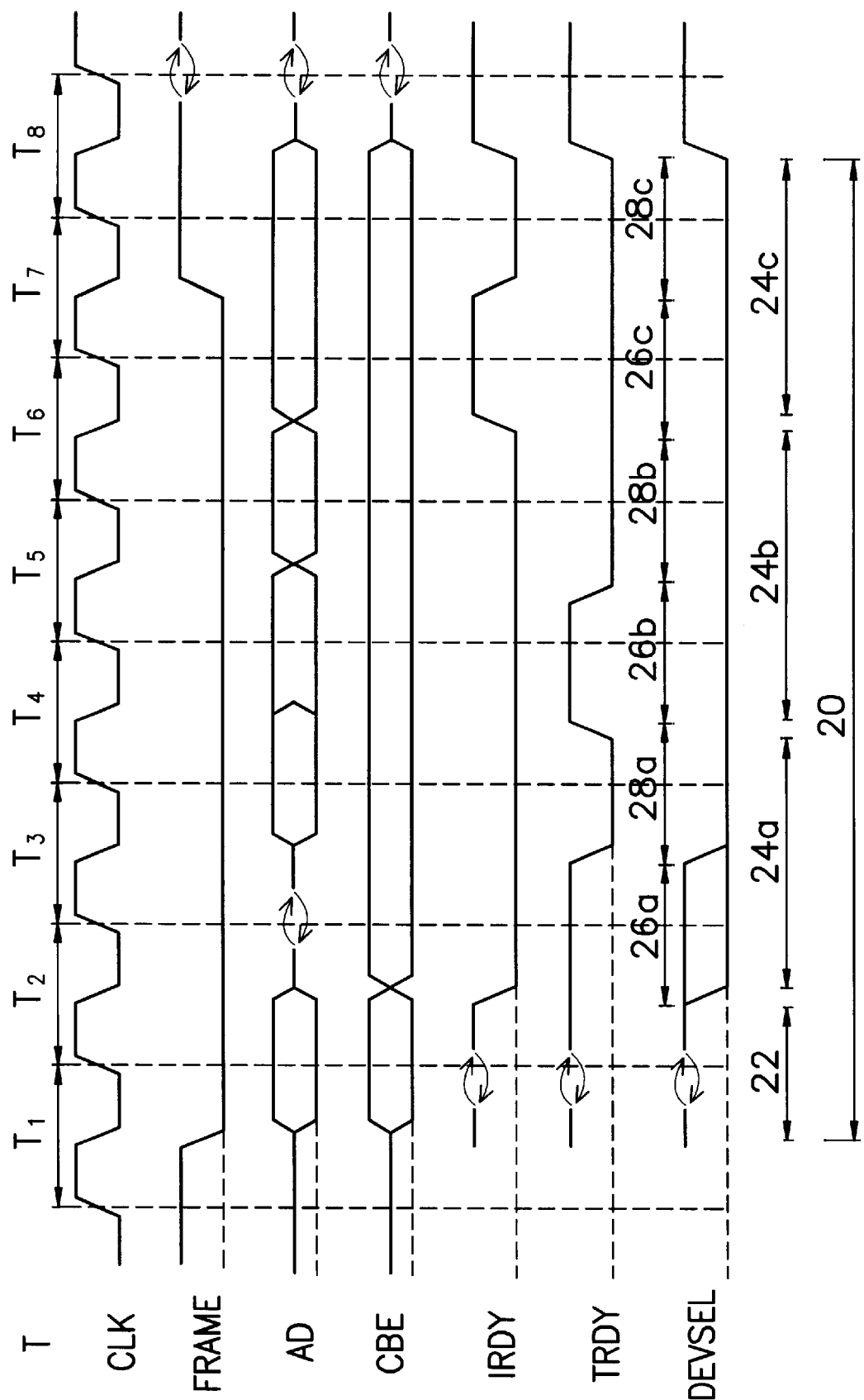
FIG. 2 is a timing diagram showing the various signals in the PCI bus interface during a read operation.

Reference will now be made in detail to the present preferred embodiments of the invention, examples of which are illustrated in the accompanying drawings. Wherever possible, the same reference numbers are used in the drawings and the description to refer to the same or like parts.

Figure 3:
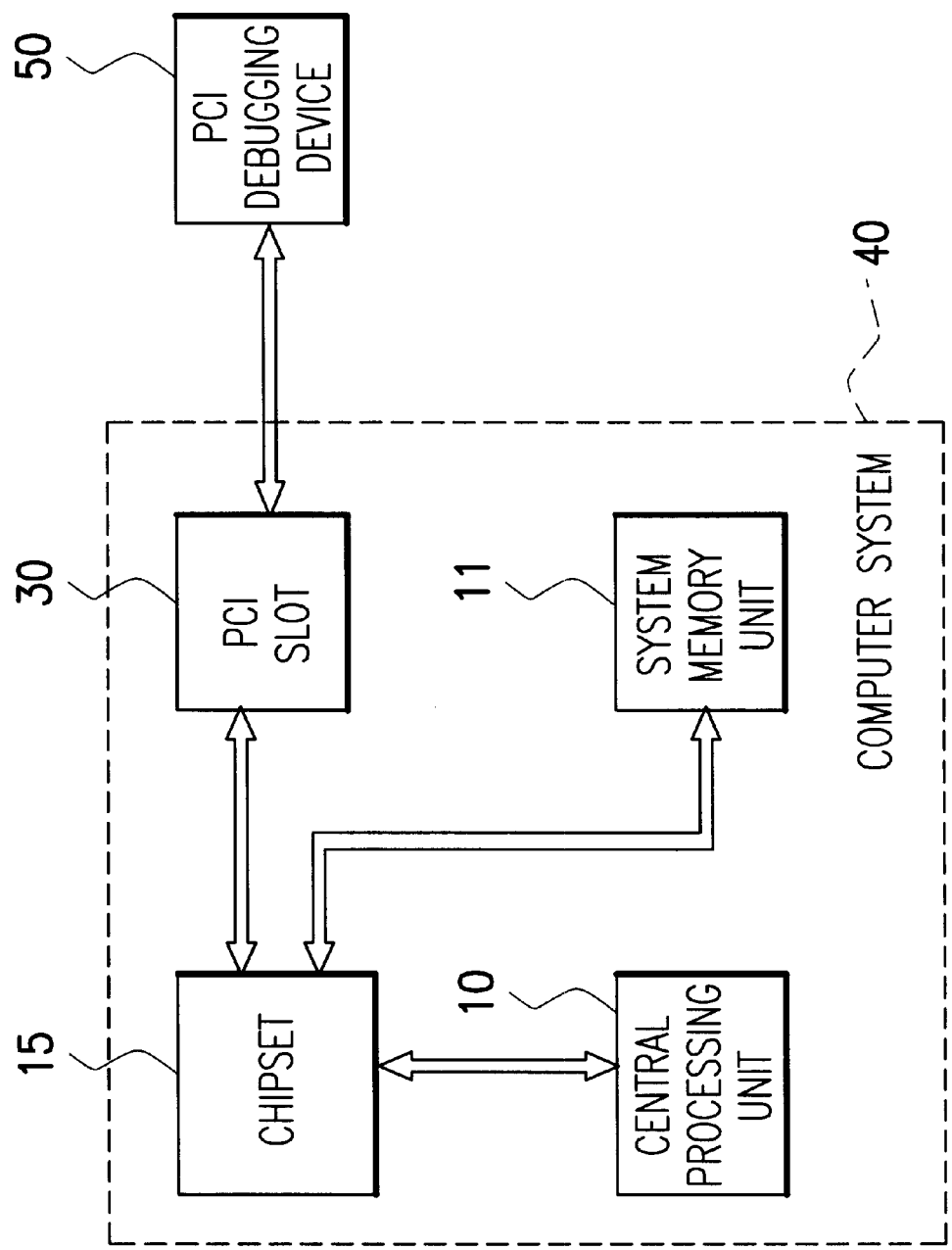
FIG. 3 is a block diagram showing the connections between a computer system and a debugging device according to one preferred embodiment of this invention.

FIG. 3 is a block diagram showing the connections between a computer system and a debugging device according to one preferred embodiment of this invention. The computer system 40 includes a central processing unit 10, a system memory unit 11, a chipset 15 and a PCI bus slot 30. The central processing unit 10 is responsible for controlling the operations of the computer system 40 such as command read, command execution, system memory access, data input/output and so on. The system memory unit 11 is a storage area for system commands and data. The chipset 15 is responsible for synchronizing the communication with other system devices. The PCI bus slot 30 is a slot for accepting a PCI bus interface card so that external functions such as drawing, networking or PCI debugging can be carried out.

The computer system of this invention is capable of operating in a debugging mode. In a debug mode or a test mode, as long as the request signal on the PCI interface remains activated, the computer system will not end any existing grant signals on the PCI interface. Furthermore, if the request signal is activated continuously, the system will halt temporarily to facilitate any debugging or amending activities.

The chipset 15 in the computer system of this invention has a debug mode pin. When voltage of the debug mode pin is pulled high by an internal resistor of the computer system, the computer system will enter a debugging mode. If the PCI bus slot 30 has a debugging card 50, grant signal will be retained by the computer system as long as the request signal is activated. Hence, any debugging operations can be carried out by the debugging device 50.

Alternatively, the debug mode pin remains 'floating' within the computer system. Through the debugging device 50 inserted into the PCI bus slot 30, the debug mode pin of the chipset 15 is pulled high and the computer system is driven into a debug mode. In the debug mode, as long as the request signal remains activated, current grant signal remains so that system debugging is facilitated.

When the debugging device 50 switches the debug mode pin of the chipset 15 into a floating state, the computer system returns to a normal running mode. In the normal mode, the debugging device 50 operates like a chipset 15 without a debug mode pin. In other words, operating parameters of the debugging device 50 can be set using the basic input/output system (BIOS).

Furthermore, the computer system can be set such that the debug mode is always turned on after starting the system. When the execution of BIOS commands is complete, the BIOS switches back the computer system to a normal running mode.

Figure 4:
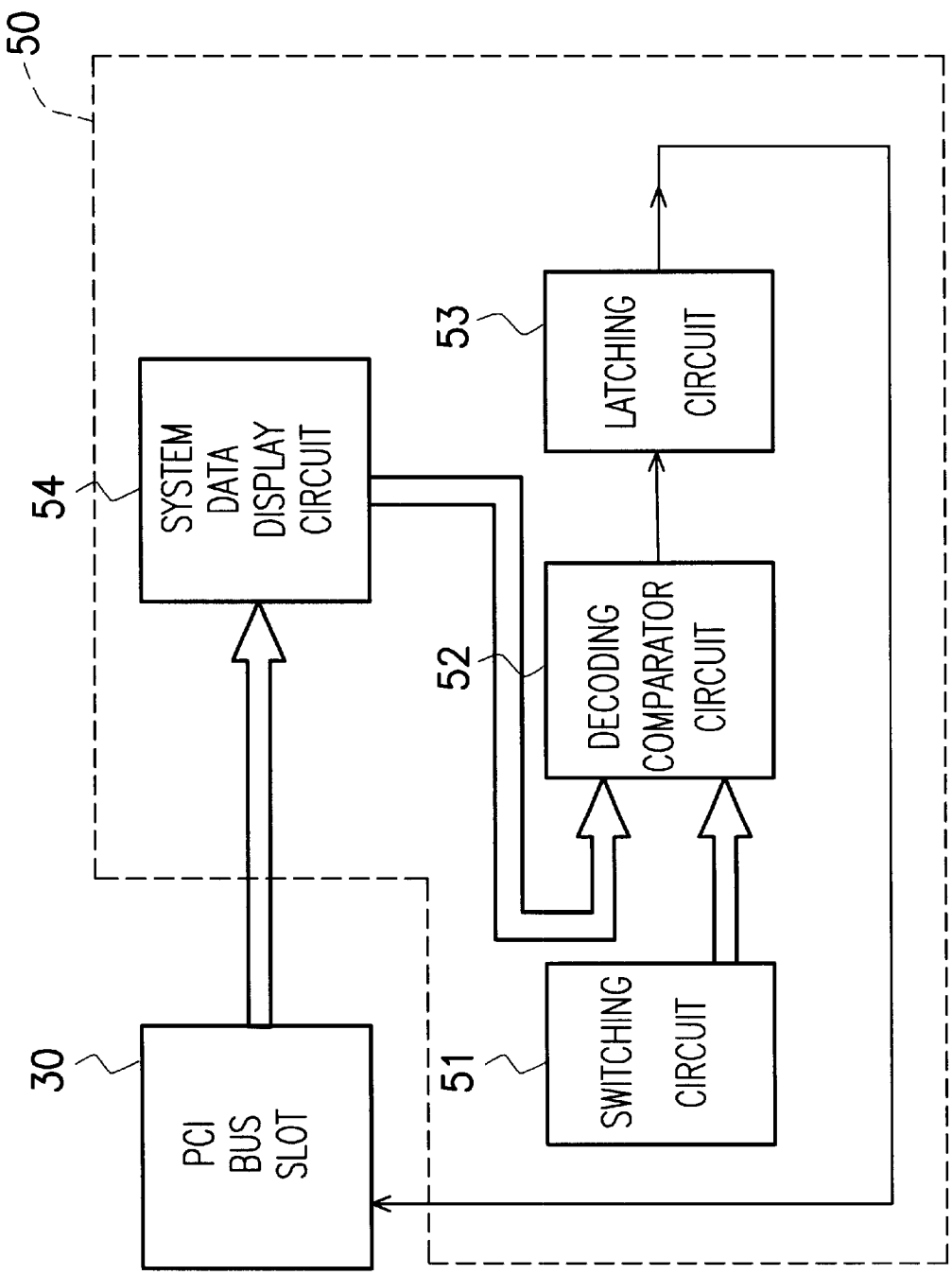
FIG. 4 is a block diagram showing the major components of a PCI bus debug device according to this invention.

FIG. 4 is a block diagram showing the major components of a PCI bus debug device according to this invention. The debugging device 50 includes a switching circuit 51, a decoding comparator circuit 52, a latch circuit 53 having reset capability and a system data display circuit 54. The system data display circuit 54 displays the addresses, data and command during system operation. The system data display circuit 54 receives command/byte enable signals from the PCI bus plug 30 via the signal lines CBE [3..0]. After going through the display circuit 54, the command/byte enable signal is latched and then an instantaneous command signal is generated. The decoding comparator circuit 52 immediately decodes the instantaneous command signal and compares with the preset waiting-to-debug command signal issued by the switching circuit 51. If the commands picked up by the comparator circuit 52 are identical, an identical command signal COMMAND is issued. As soon as both the COMMAND signal and the target ready signal are at enable status, a triggering signal is generated to the latch circuit 53, so that the request signal is enabled.

Figure 5:
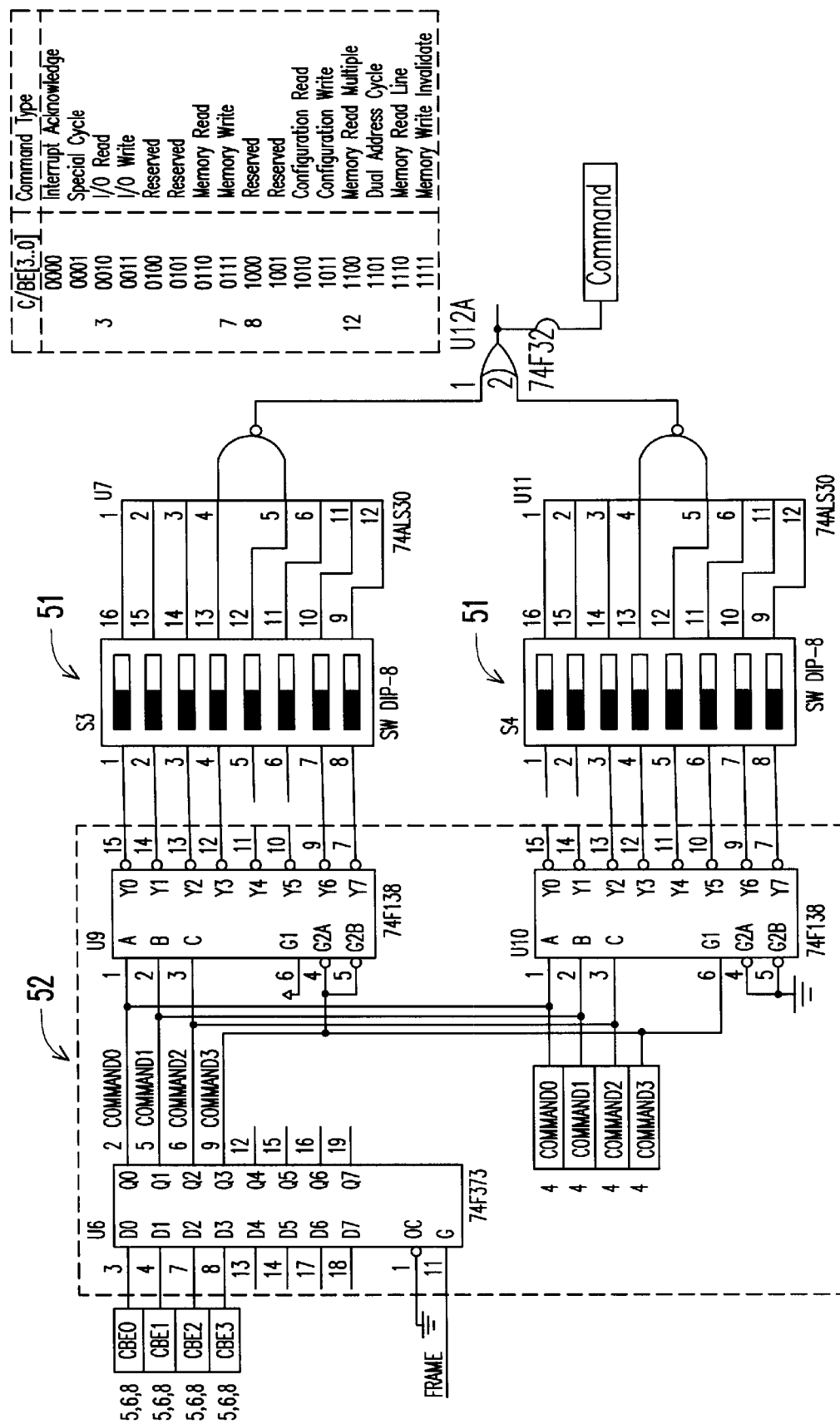
FIG. 5 is a circuit diagram showing the connections of a decoding comparator circuit and a switching circuit according to this invention.

FIG. 5 is a circuit diagram showing the connections of a decoding comparator circuit and a switching circuit according to this invention. As shown in FIG. 5, byte enable signals CBE [3..0] from the system data display circuit 40 is latched by a latch circuit 74F373. The latch circuit 74F373 is coupled to a decoding circuit composed of two 74F138 chips. After decoding, an enable signal is produced at any one of the output terminals of either 74F138 chips. The enable signal is compared with a wait-to-debug command signal preset by user in the switching circuit. If the two signals are identical (in other words, an output terminal of the chip 74F138 is enabled while a corresponding position of the switching circuit are conductive), enable signals are output from the multi-input NAND gate 74ALS30. Thereafter, an enable signal indicating identical commands is output from the output terminal of the OR gate 74F32 to COMMAND.

Figure 6:
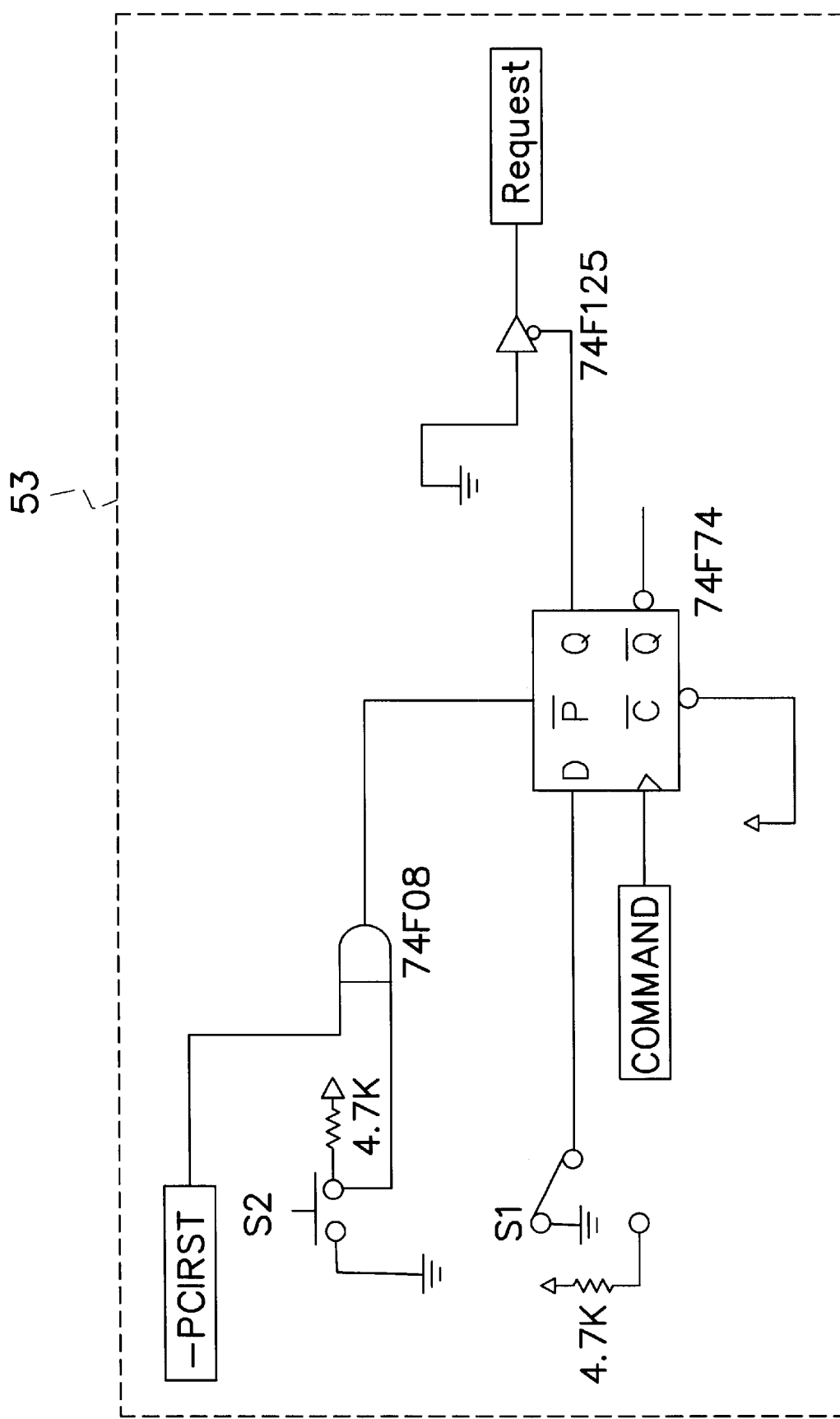
FIG. 6 is a circuit diagram showing the connections within a latch circuit.

FIG. 6 is a circuit diagram showing the connections within a latch circuit. As shown in FIG. 6, when both the CLEAR terminal and the PRESET terminal of the latch device 74F74 are disabled and switch S1 is attached to ground, the tri-state buffer 74F125 will be enabled by the output terminal of the latch device 74F74 if command identical signal COMMAND is received. The tri-state buffer 74F125 will issue a request signal to the PCI system. On the other hand, if the switch S1 is attached to a high potential source, the output terminal of the latch device 74F74 will disable the tri-state buffer 74F125 even when a command identical signal COMMAND is picked up. When the tri-state buffer 74F125 is disabled, a high resistance is output from the tri-state buffer 74F125 so that the system has to operate in a normal running mode. If the system RESET or switch S2 is connected to earth, the output terminal of the AND gate 74F08 will preset the latch device 74F74 leading to a disabling of the tri-state buffer 74F125. Hence, the tri-state buffer 74F125 will output a high resistance and the system will enter a normal running mode. In the normal mode, the system is able to execute various programs such as BIOS testing or application program coding.

In summary, the invention provides a PCI debugging device with a PCI interface and the method for operating the debugging device. The PCI debugging device is capable of halting the operation of a computer system and displaying system information such as the address, data and command signals of the system. In addition, no ISA bus debug card is needed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A PCI debugging device for debugging a system with a PCI interface, wherein the PCI interface includes a request signal, a grant signal and a target ready signal, and the system has a debug mode such that current grant signal is retained as long as the request signal is activated, the PCI debugging device comprises of:

a switching circuit for setting a wait-to-debug signal;
a system data display circuit coupled to the PCI interface for displaying data on the PCI interface and sending an instantaneous command signal out;
a decoding comparator circuit coupled to the switching circuit and the system data display circuit for decoding the instantaneous command signal and comparing with the wait-to-debug command signal, and then generating an identical command signal; and
a latch circuit with reset capability coupled to the decode comparator circuit for latching the identical command signal and activating the request signal.

2. The PCI debugging device of claim 1, wherein the switching circuit is implemented using a selective switch either in a conductive or cut-off state.

3. The PCI debugging device of claim 1, wherein the decoding comparator circuit further includes:

a decoder for decoding the instantaneous command signal;

a comparator circuit coupled to the switching circuit and the decoder for comparing the decoded instantaneous command signal with the wait-to-debug command signal and then generating the identical command signal.

4. The PCI debugging device of claim 1, wherein the latch circuit includes:

a latch device that generates an enable signal activating the request signal when the identical command signal is enabled;

an AND gate that resets the latch device and disables the request signal when system reset signal is enabled or a reset switch is activated.

5. The PCI debugging system of claim 1, wherein the debugging mode is automatically set on system startup, but returns to a normal running mode as soon as the execution of BIOS program is complete.

6. The PCI debugging system of claim 1, wherein the debugging mode is set on system startup as soon as the presence of a debugging device is detected.

7. A debugging method for a system with a PCI interface, wherein the PCI interface includes a request signal, a grant signal and a target ready signal, and the system has a debug mode such that current grant signal is retained as long as the request signal is activated, the debugging method comprises the steps of:

providing a wait-to-debug command signal;

detecting an instantaneous command signal on the PCI interface;

decoding the instantaneous command signal;

comparing the decoded instantaneous command signal with the wait-to-debug signal, and generating an identical command signal; and providing a reset input to reset the request signal.

8. The debugging method of claim 7, wherein addresses, data and command signals on the PCI interface is also instantaneously displayed.

9. A debugging system for a system with a PCI interface, wherein the PCI interface includes a request signal, a grant signal and a target ready signal, comprising:

a computer system having PCI interface slot, wherein the computer system has a debugging mode such that current grant signal is retained by the computer system as long as the request signal is enabled;

a PCI debugging card coupled to the PCI interface slot, comprising:

a switching circuit for setting a wait-to-debug signal;

a system data display circuit coupled to the PCI interface for displaying data on the PCI interface and sending an instantaneous command signal out;

a decoding comparator circuit coupled to the switching circuit and the system data display circuit for decoding the instantaneous command signal and comparing with the wait-to-debug command signal, and then generating an identical command signal; and a latch circuit with reset capability coupled to the decode comparator circuit for latching the identical command signal and activating the request signal.

10. The debugging system of claim 9, wherein the switching circuit is implemented using a selective switch either in a conductive or cut-off state.

11. The debugging system of claim 9, wherein the decoding comparator circuit further includes:

a decoder for decoding the instantaneous command signal;

a comparator circuit coupled to the switching circuit and the decoder for comparing the decoded instantaneous command signal with the wait-to-debug command signal and then generating the identical command signal.

12. The debugging system of claim 9, wherein the computer system includes a resistor for setting the computer system into a debugging mode.

13. The debugging system of claim 9, wherein the PCI debugging card has a resistor such that debugging mode is set by the computer system when a resistor is detected via the PCI interface.

14. The debugging system of claim 9, wherein the latch circuit includes:

a latch device that generates an enable signal activating the request signal when the identical command signal is enabled;

an AND gate that resets the latch device and disables the request signal when system reset signal is enabled or a reset switch is activated.

15. The debugging system of claim 9, wherein the latch circuit includes a switch for resetting the request signal.

16. The debugging system of claim 9, wherein the computer system proceeds to operate in the normal running mode on system startup if a PCI debugging card is still not detect after a preset time period.

17. The debugging system of claim 9, wherein the computer system proceeds to operate in the debugging mode if a PCI debugging card is detected.

18. A chipset comprising a PCI debugging mode used in a computer system with a PCI interface, wherein the computer system has a motherboard, and the motherboard has a plurality of PCI slots, as the PCI debugging mode is enabled, the computer system enters its own a debugging mode, and as the PCI debugging mode and a request signal of the PCI interface are retained at enabling status, the chipset does not halt a grant signal of the PCI interface, wherein the PCI debugging mode of the chipset can set the debugging mode by a basic input/output system (BIOS) of the computer system.

19. The chipset of claim 18, wherein the chipset comprises a debugging-mode pin, which can be coupled with a resistor and allows the PCI debugging mode is enabled.

20. The chipset of claim 18, wherein the PCI debugging mode of the chipset can enable the debugging mode by detecting a resistor coupled to a debugging device, which is plugged on one of the PCI slots.

* * * * *